(12) United States Patent
Rydkin et al.

(10) Patent No.: US 10,341,342 B2
(45) Date of Patent: Jul. 2, 2019

(54) CONFIGURATION DATA BASED FINGERPRINTING FOR ACCESS TO A RESOURCE

(71) Applicant: CARRIER CORPORATION, Farmington, CT (US)

(72) Inventors: Maxim Rydkin, Penfield, NY (US); Ben Holm, Farmington, NY (US)

(73) Assignee: CARRIER CORPORATION, Farmington, CT (US)

( * ) Notice: Subject to any disclaimer, the term of this patent is extended or adjusted under 35 U.S.C. 154(b) by 132 days.

(21) Appl. No.: 15/010,186

(22) Filed: Jan. 29, 2016

(65) Prior Publication Data
US 2016/0234210 A1 Aug. 11, 2016

Related U.S. Application Data

(60) Provisional application No. 62/112,354, filed on Feb. 5, 2015.

(51) Int. Cl.
H04L 29/06 (2006.01)

(52) U.S. Cl.
CPC ........ H04L 63/0876 (2013.01); H04L 63/102 (2013.01)

(58) Field of Classification Search
CPC .. H04L 63/0876; H04L 63/102; H04L 47/762
See application file for complete search history.

(56) References Cited

U.S. PATENT DOCUMENTS

| | | |
|---|---|---|
| 5,815,709 A | 9/1998 | Waldo et al. |
| 6,243,468 B1 | 6/2001 | Pearce et al. |
| 7,272,728 B2 | 9/2007 | Pierson et al. |
| 7,506,056 B2 | 3/2009 | Satish et al. |
| 7,539,862 B2 | 5/2009 | Edgett et al. |
| 7,565,541 B1 | 7/2009 | Tarbouriech |
| 8,024,488 B2 | 9/2011 | Salowey et al. |
| 8,126,816 B2 | 2/2012 | Mu et al. |
| 8,171,287 B2 | 5/2012 | Villela |
| 8,213,907 B2 | 7/2012 | Etchegoyen |
| 8,245,030 B2 | 8/2012 | Lin et al. |
| 8,271,780 B2 | 9/2012 | Xiao et al. |

(Continued)

OTHER PUBLICATIONS

Roel Maes et al., "A Pay-per-Use Licensing Scheme for Hardware IP Cores in Recent SRAM-Based FPGAs," IEEE Transactions on information forensics and security, vol. 7, No. 1, Feb. 2012, pp. 98-108. (Year: 2012).*

(Continued)

Primary Examiner — Luu T Pham
Assistant Examiner — Canh Le
(74) Attorney, Agent, or Firm — Cantor Colburn LLP (57) ABSTRACT

A method for providing a user system access to a resource includes obtaining configuration data identifying devices at the user system; receiving a request from the user system for access to a resource; applying a function to the configuration data to generate a current fingerprint; comparing the current fingerprint to a reference fingerprint associated with the resource; determining a degree of similarity between the current fingerprint and the reference fingerprint; and granting access to the resource in response to the degree of similarity between the current fingerprint and the reference fingerprint.

8 Claims, 8 Drawing Sheets

(56) References Cited

U.S. PATENT DOCUMENTS

| | | |
|---|---|---|
| 8,316,421 B2 | 11/2012 | Etchegoyen |
| 8,392,978 B2 | 3/2013 | Grove et al. |
| 8,473,480 B1 | 6/2013 | Hu et al. |
| 8,566,589 B1 | 10/2013 | Satish |
| 8,590,024 B2 | 11/2013 | Sims et al. |
| 8,601,109 B2 | 12/2013 | Johannsen |
| 8,682,297 B2 | 3/2014 | Chevsky et al. |
| 8,707,027 B1 | 4/2014 | Naik |
| 8,745,049 B2 | 6/2014 | Mourad et al. |
| 8,806,632 B2 | 8/2014 | Stefanidakis et al. |
| 2004/0199621 A1 | 10/2004 | Lau |
| 2005/0166053 A1 | 7/2005 | Cui et al. |
| 2006/0200856 A1 | 9/2006 | Salowey et al. |
| 2007/0014444 A1* | 1/2007 | Nordin ............... G06K 9/00073 382/125 |
| 2007/0113090 A1 | 5/2007 | Villela |
| 2007/0124803 A1 | 5/2007 | Taraz |
| 2010/0046749 A1 | 2/2010 | Hatano et al. |
| 2010/0229224 A1* | 9/2010 | Etchegoyen ............ G06F 21/31 726/5 |
| 2010/0332400 A1 | 12/2010 | Etchegoyen |
| 2010/0333213 A1* | 12/2010 | Etchegoyen .......... G06F 21/105 726/29 |
| 2011/0009092 A1* | 1/2011 | Etchegoyen ........ H04L 63/0428 455/411 |
| 2011/0010560 A1 | 1/2011 | Etchegoyen |
| 2012/0036366 A1* | 2/2012 | May .................... G06F 21/6209 713/176 |
| 2012/0324446 A1 | 12/2012 | Fries et al. |
| 2013/0212693 A1* | 8/2013 | Etchegoyen ........ G06F 21/6254 726/26 |
| 2014/0245443 A1* | 8/2014 | Chakraborty ....... H04L 63/1425 726/23 |
| 2016/0094578 A1* | 3/2016 | McQuillan .......... H04L 63/1433 726/23 |
| 2016/0155128 A1* | 6/2016 | Desai ................ G06Q 20/4016 705/44 |
| 2016/0179581 A1* | 6/2016 | Soundararajan ...... G06F 9/5033 718/104 |

OTHER PUBLICATIONS

Muhammad Yaasir et al., "Risk Score Calculation for Cloud Biometric Authentication," 2016 IEEE, pp. 1-4. (Year: 2016).*

* cited by examiner

CONFIGURATION DATA BASED FINGERPRINTING FOR ACCESS TO A RESOURCE

CROSS-REFERENCE TO RELATED APPLICATIONS

This application claims the benefit of U.S. provisional patent application Ser. No. 62/112,354, filed Feb. 5, 2015, the entire contents of which are incorporated herein by reference.

TECHNICAL FIELD

The invention relates generally to providing access to a resource, and more particularly, to providing access to a resource in response to a fingerprint generated from system configuration data.

BACKGROUND

In virtualized and/or cloud environments, a provider often receives requests from a user for access to a resource. For example, a user may contact a software provider to request a license to access a software feature. In order to grant the user access to the resource, the provider uses some sort of verification that the user is permitted access to the resource. One existing technique for granting access to a resource includes identifying a user based on specific hardware identifiers associated with hardware associated with a user system. Another existing technique for granting access to a resource includes the use of external hardware keys (e.g., USB dongles). Both these technologies are not suitable for use in cloud/virtual environments or with large customer data centers. Virtual environments can be used to duplicate hardware identifiers. Hardware keys fail, get lost or damaged in handling in data centers and cannot be used in cloud environments. Further, multiple hardware keys are required in high-availability applications.

BRIEF DESCRIPTION

According to an embodiment of the invention, a method for providing a user system access to a resource includes obtaining configuration data identifying devices at the user system; receiving a request from the user system for access to a resource; applying a function to the configuration data to generate a current fingerprint; comparing the current fingerprint to a reference fingerprint associated with the resource; determining a degree of similarity between the current fingerprint and the reference fingerprint; and granting access to the resource in response to the degree of similarity between the current fingerprint and the reference fingerprint.

In addition to one or more of the features described above or below, or as an alternative, further embodiments could include wherein the configuration data includes at least one of a device name, a device identifier and a device address for each of the devices.

In addition to one or more of the features described above or below, or as an alternative, further embodiments could include wherein granting access includes providing a response to the user system granting access to the resource.

In addition to one or more of the features described above or below, or as an alternative, further embodiments could include wherein the response includes information needed to implement the resource.

In addition to one or more of the features described above or below, or as an alternative, further embodiments could include wherein the information needed to implement the resource includes a license key.

In addition to one or more of the features described above or below, or as an alternative, further embodiments could include in a binding mode: obtaining initial configuration data identifying the devices at the user system; generating the reference fingerprint in response to the initial configuration data; and binding the reference fingerprint to the resource.

In addition to one or more of the features described above or below, or as an alternative, further embodiments could include wherein: the applying the function to the configuration data to generate the current fingerprint includes dividing the configuration data into blocks and applying the function to each block to generate current fingerprint blocks; the comparing includes comparing the current fingerprint blocks to reference fingerprint blocks associated with the resource; and the determining includes determining a degree of similarity between the current fingerprint blocks and the reference fingerprint blocks.

In addition to one or more of the features described above or below, or as an alternative, further embodiments could include wherein the determining includes determining a number of current fingerprint blocks matching reference fingerprint blocks.

According to another embodiment of the invention, a system for providing a user system access to a resource includes a configuration data store to store configuration data identifying devices at the user system; a data server to receive a request from the user system for access to a resource; the data server to apply a function to the configuration data to generate a current fingerprint; a resource server to compare the current fingerprint to a reference fingerprint associated with the resource; the resource server to determine a degree of similarity between the current fingerprint and the reference fingerprint; and the resource server to grant access to the resource in response to the degree of similarity between the current fingerprint and the reference fingerprint.

According to another embodiment of the invention, a computer program product tangibly embodied on a non-transitory computer readable storage medium for providing a user system access to a resource, the computer program product including instructions for causing a processor to execute operations including: obtaining configuration data identifying devices at the user system; receiving a request from the user system for access to a resource; applying a function to the configuration data to generate a current fingerprint; comparing the current fingerprint to a reference fingerprint associated with the resource; determining a degree of similarity between the current fingerprint and the reference fingerprint; and granting access to the resource in response to the degree of similarity between the current fingerprint and the reference fingerprint.

Other exemplary embodiments are described herein.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
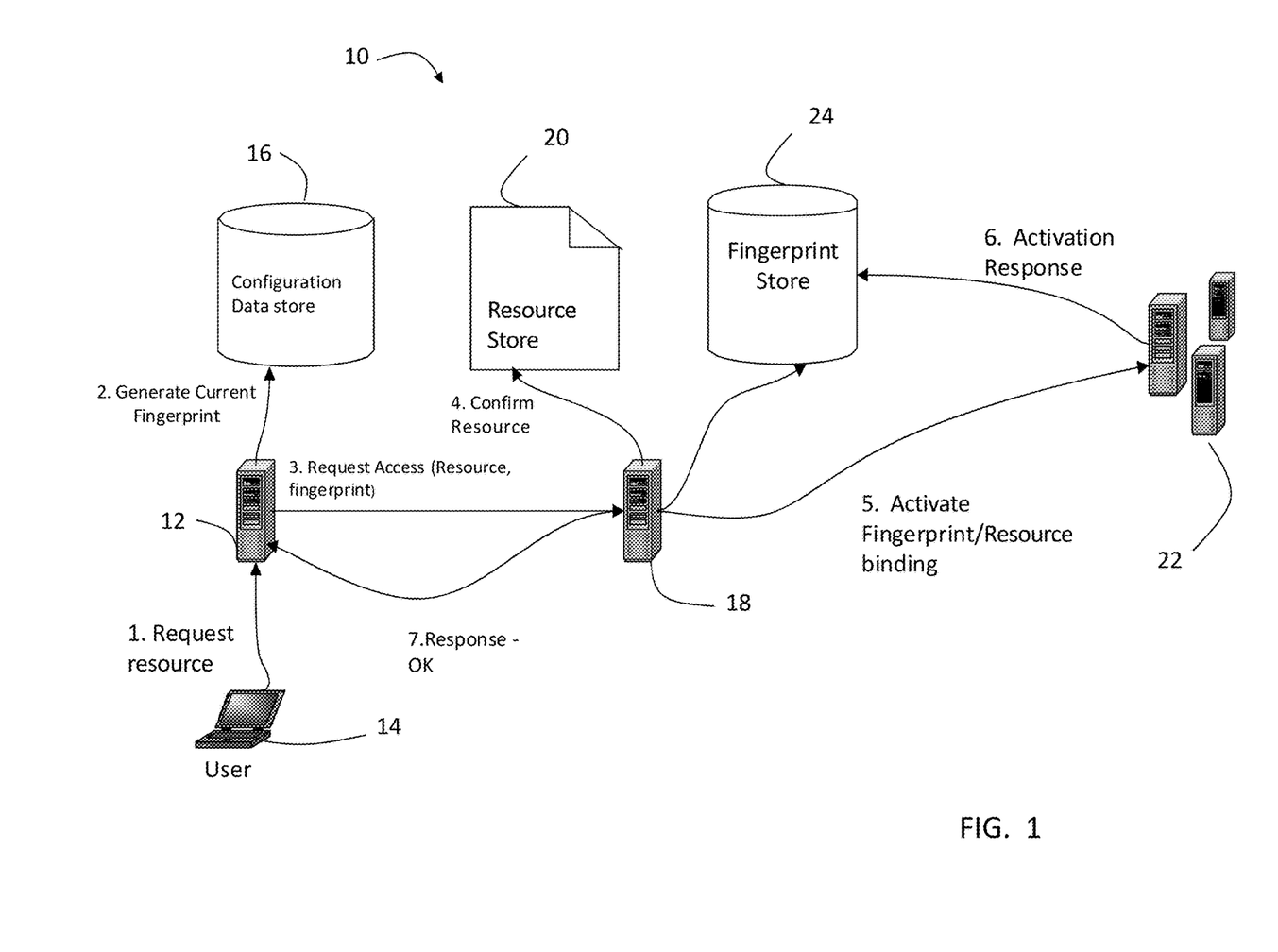
FIG. 1 depicts an exemplary system for granting access to a resource in a binding mode.

FIG. 1 depicts an exemplary system 10 for granting access to a resource. As described in further detail herein, providing access to a resource may include allowing access to a program/data or allowing execution of an action. System 10 may operate in a binding mode or a running mode. In binding mode, configuration data associated with a user system is used to establish a reference fingerprint. In the subsequent running mode, requests for a resource are granted or denied by comparing a current fingerprint to the reference fingerprint. In FIG. 1, system 10 operates in the binding mode.

System 10 includes a data server 12 that receives requests from a user system 14 for access to a resource. Data server 12 also responds back to the user system 14 granting or denying access to the resource, and providing any data (e.g., access code, license key) to the user system 14 needed to access the resource. Data server 12 may be implemented using existing microprocessor-based equipment, such as a computer, server, cloud-computing facility, etc. Data server 12 may also be implemented using low-computation devices, such as controllers in appliances, automobiles, etc.

A configuration data store 16 is used to store configuration data for the user system 14. The configuration data store 16 may be implemented using known data storage devices (e.g., hard drives) and may be local to data server 12 or at a location remote from data server 12. Configuration data store 16 may also be implemented internal to data server 12. Configuration data store 16 includes a user identifier associated with user system 14 and device data corresponding to equipment associated with user system 14. In an exemplary embodiment, the configuration data includes a list of devices associated with user system 14 including a device name, a device identifier and a device address. The configuration data may correspond to networked devices installed at a user facility. In one example, the devices populating the configuration data relate to a security system, and may include devices such as security cameras, locks, ID readers, security controller, etc.

A resource server 18 is in communication with data server 16. Resource server 18 manages resources stored in a resource store 20. Resource server 18 may be implemented using existing microprocessor-based equipment, such as a computer, server, cloud-computing facility, etc. Resource server 18 and data server 16 may be implemented using the same components, but are shown separate to facilitate description of the operations performed. Resource store 20 may be implemented using known data storage devices (e.g., hard drives) and may be local to resource server 18 or at a location remote from resource server 18. Resource store 20 may also be implemented internal to resource server 18. Resource store 20 stores resources that may be available to user system 14. Such resources may include a licensable material, such as software enhancements, plug-ins, updates, etc.

Resource server 18 is in communication with activation server 22 and fingerprint store 24. Activation server 22 may be implemented using existing microprocessor-based equipment, such as a computer, server, cloud-computing facility, etc. Activation server 22 and resource server 18 may be implemented using the same components, but are shown separate to facilitate description of the operations performed. Fingerprint store 24 may be implemented using known data storage devices (e.g., hard drives) and may be local to resource server 18 or at a location remote from resource server 18. Fingerprint store 24 may also be implemented internal to resource server 18. Activation server 22 facilitates an initial binding between a reference fingerprint and a resource. Fingerprint store 24 stores an association between reference fingerprints and resources. When a user system 14 requests a resource, the resource server 18 compares a current fingerprint to a reference fingerprint in fingerprint store 24 to determine if the user system 14 may have access to the resource bound with the reference fingerprint.

Figure 2:
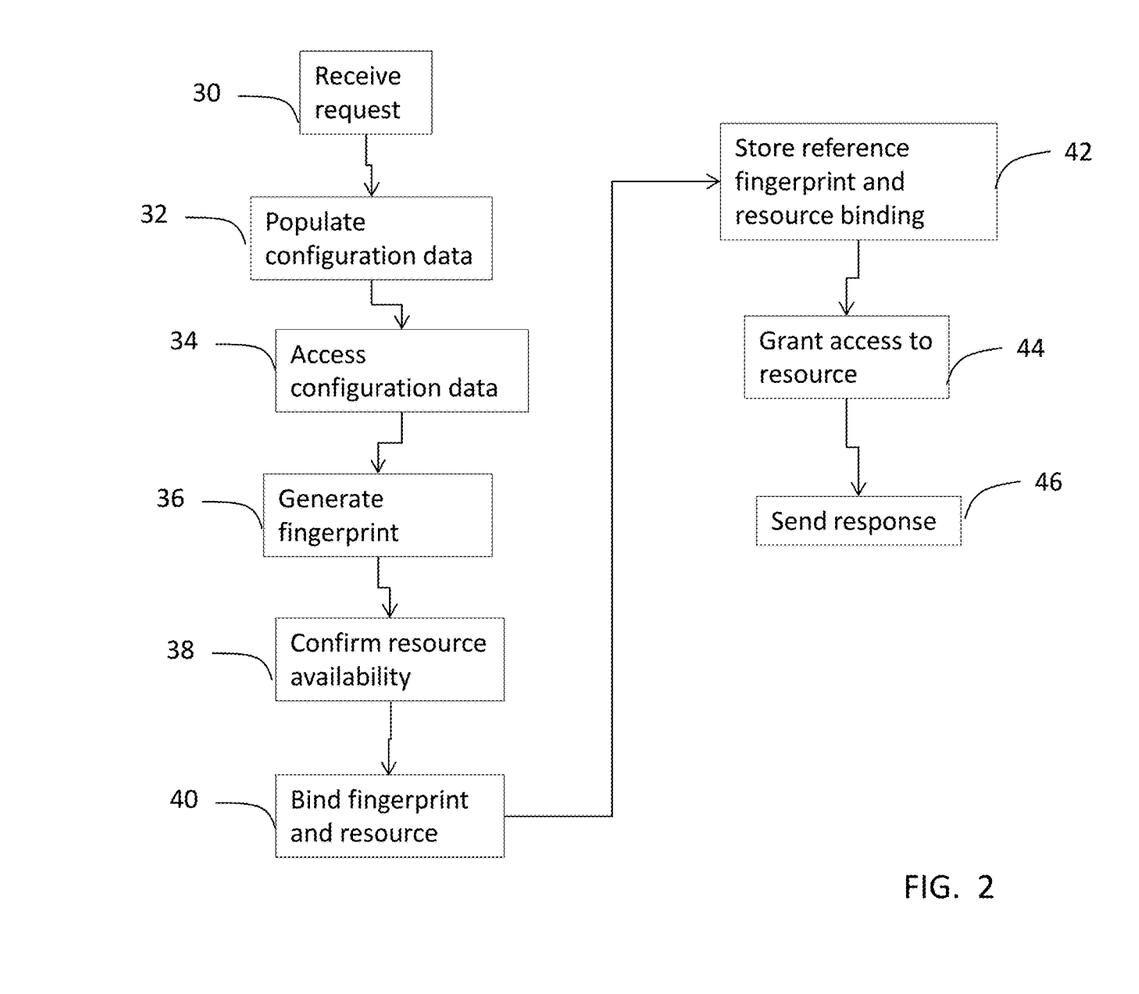
FIG. 2 depicts an exemplary process for granting access to a resource in the binding mode.

FIG. 2 depicts an exemplary process for granting access to a resource in the binding mode. The process begins at 30, where a request from user system 14 for access to a resource is received at data server 12. This is shown as flow 1 in FIG. 1. At block 32, initial configuration data for the user system 14 is populated in the configuration data store 16. Block 32 may occur prior to block 30. The initial configuration data in configuration data store 16 includes a list of devices associated with user system 14 and may include fields such as device name, device identifier and device address (e.g., a MAC or IP address).

At block 34, data server 12 accesses the initial configuration data corresponding to the user system 14 from configuration data store 16. An optional evaluation may occur after block 34, where the data server 12 determines if there is a sufficient amount of initial configuration data in configuration data store 16 to generate a reliable fingerprint. If not, the process may terminate at block 34, with the user system 14 receiving a default response (e.g., granting or denying access to the resource).

Assuming there is a sufficient amount of initial configuration data in configuration data store 16, at block 36 data server 12 generates a current fingerprint in response to the configuration data associated with the user system 14. This is shown as flow 2 in FIG. 2. Techniques to generate the fingerprint are discussed herein with reference to FIGS. 5-8.

The current fingerprint and an identification of the requested resource are provided to the resource server 18. This is shown as flow 3 in FIG. 1. The resource server 18 confirms that the resource is available at block 38 of FIG. 2. The resource server 18 may consult resource store 20 to determine if the user system 14 is authorized to have access to the resource. Resource server 18 may also confirm that the requested resource is available for distribution (e.g., has not expired).

As noted above, the resource may include an item (e.g., a software application, license key, data) or permission to execute an action. For example, in the example where the user system 14 is a building security system, the access to the resource may include one or more of permission to add an additional door configuration to the system, permission to open a particular application/executable, permission to open multiple instances of the same application/executable, permission to run a certain kind of a report, permission to print an access badge, permission to schedule a facility visitor, etc. Another example of accessing a resource includes determining which version of software (e.g., professional versus home) may be accessed based on the configuration data. As used herein, providing access to a resource is intended to include, but not be limited to, items (e.g., software applications and/or data) and permissions to perform actions.

If the resource is available, resource server 18 sends a request to the activation server 22 to bind the current fingerprint and the resource, as shown in flow 5 of FIG. 1. At block 40 of FIG. 2, the activation server 22 designates the current fingerprint as a reference fingerprint and binds the reference fingerprint and resource. Binding refers to associating the resource as being available to a user system 14 having the reference fingerprint.

At block 42, the reference fingerprint and resource are stored in the fingerprint store 24, as shown in flow 6 of FIG. 1. The user system 14 is now granted access to the resource as shown at block 44. A response to the user system 14 may be sent at block 46, as shown in flow 7 of FIG. 1. The response from the data server 12 may include information needed to implement the resource (e.g., license keys, software update, permission to perform an action, etc.).

Figure 3:
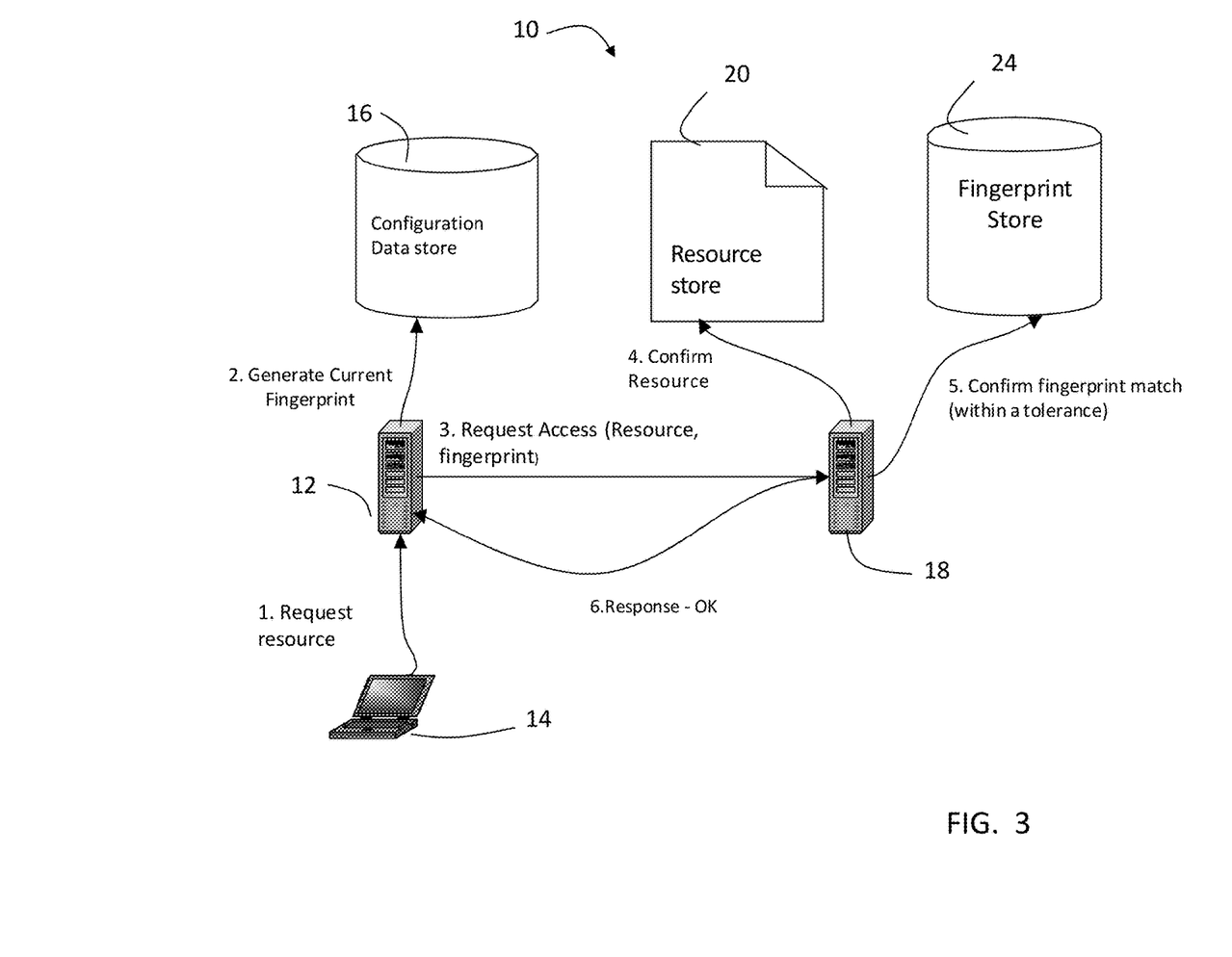
FIG. 3 depicts an exemplary system for granting access to a resource in a running mode.
Figure 4:
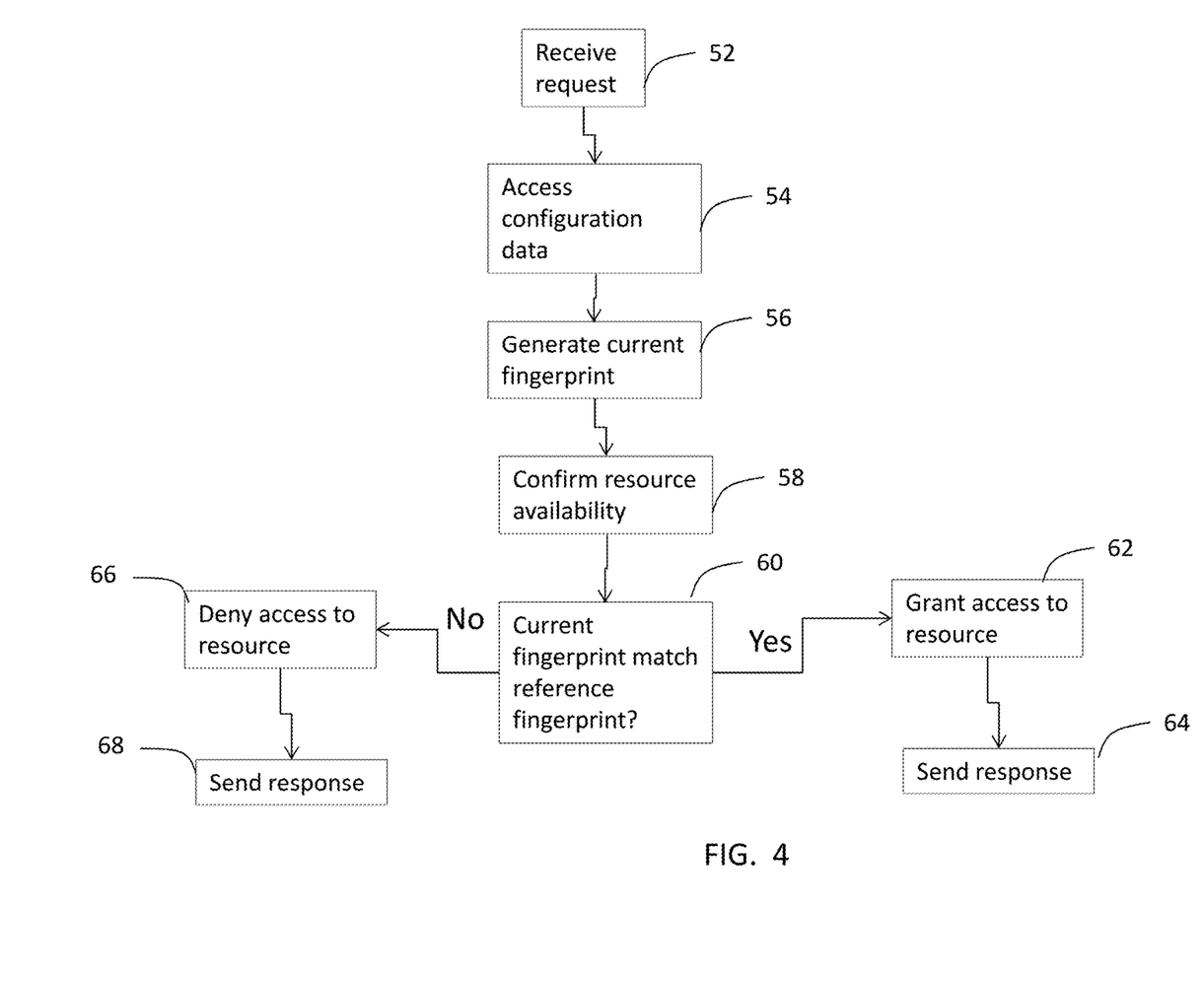
FIG. 4 depicts an exemplary process for granting access to a resource in the running mode.

Once the binding mode is completed, future requests for a resource are processed using running mode. FIG. 3 depicts system 10 operating in a running mode. Running mode occurs after the initial fingerprint-resource binding has occurred. FIG. 4 is a flowchart of processing a user system request in running mode. The process begins at 52, where a request from user system 14 for access to a resource is received at data server 12. This is shown as flow 1 in FIG. 3.

At block 54, data server 12 accesses the configuration data corresponding to the user system 14 from configuration data store 16. At block 56, data server 12 generates a current fingerprint in response to the configuration data associated with the user system 14. This is shown as flow 2 in FIG. 3. Techniques to generate the fingerprint are discussed herein with reference to FIGS. 5-8.

The current fingerprint and an identification of the requested resource are provided to the resource server 18. This is shown as flow 3 in FIG. 3. The resource server 18 confirms that the resource is available at block 58 of FIG. 4. The resource server 18 may consult resource store 20 to determine that the requested resource is available (e.g., has not expired).

If the resource is available, at block 60 the resource server 18 then determines if the current fingerprint matches the reference fingerprint associated with that resource. The resource server 18 may determine that the degree of similarity between the current fingerprint and the reference fingerprint meets a threshold in order to declare a match. In some embodiments, the degree of similarity may require an exact match. If at block 60, if the current fingerprint matches the reference fingerprint, flow proceeds to block 62 where access to the resource is granted. At block 64, data server 12 notifies user system 14 of the access. The response from the data server 12 may include information needed to implement the resource (e.g., license keys, software update, permission to perform an action, etc.). This is shown as flow 6 in FIG. 3. If at block 60, the current fingerprint does not match the reference fingerprint, flow proceeds to block 66 where access to the resource is denied. At block 68, the data server notifies the user system 14 of the denial of access.

Figure 5:
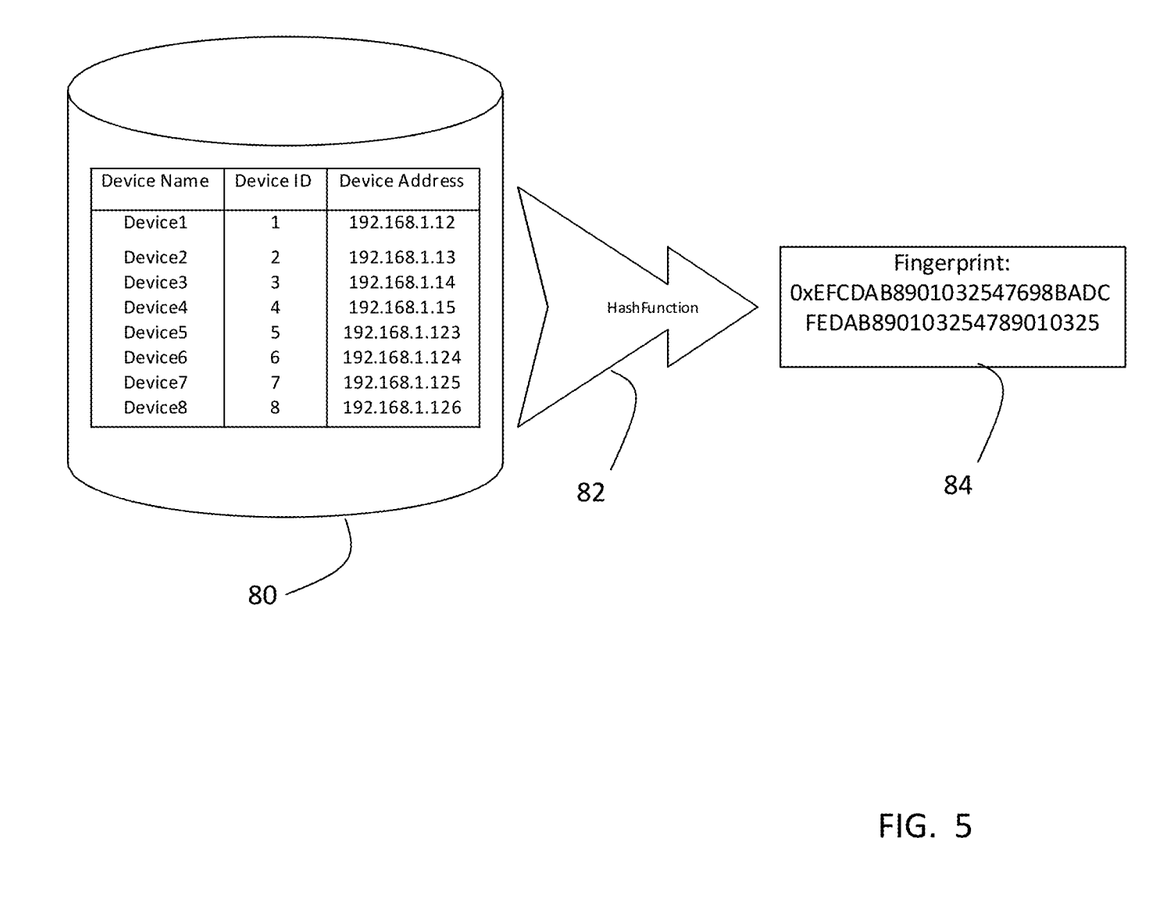
FIG. 5 depicts generation of a fingerprint in an exemplary embodiment.

As noted above, in binding a mode the user system configuration data is used to generate a reference fingerprint. In subsequent running mode, a current fingerprint is compared to a reference fingerprint to authorize access to a resource. One example of generating a fingerprint is illustrated in FIG. 5. FIG. 5 depicts exemplary configuration data 80. The configuration data 80 may include fields for device name, device identifier and device address on a user system network. To generate a fingerprint, a function 82 (e.g., a hash function) is applied to the device names, device identifiers and device addresses to generate the fingerprint 84.

Figure 6:
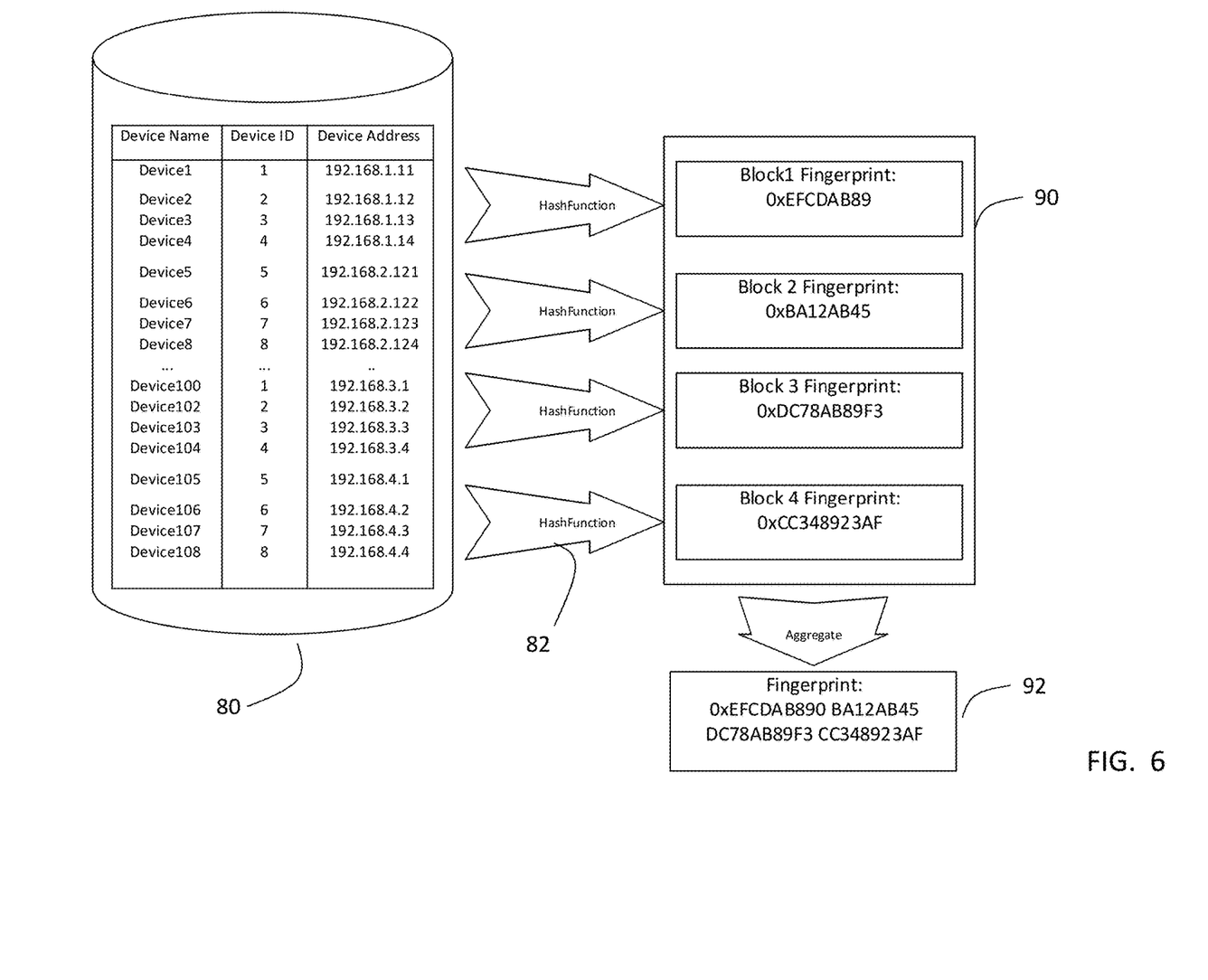
FIG. 6 depicts generation of a fingerprint in an exemplary embodiment.

Another example of generating a fingerprint is illustrated in FIG. 6. FIG. 6 depicts exemplary configuration data 80. The configuration data 80 may include fields for device name, device identifier and device address on a user system network. The configuration data is divided into a number of blocks, and each block is subjected to a function 82 (e.g., a hash function) applied to the device names, device identifiers and device addresses to generate a number of fingerprint blocks 90. The fingerprint blocks 90 are then aggregated to form fingerprint 92.

Figure 7:
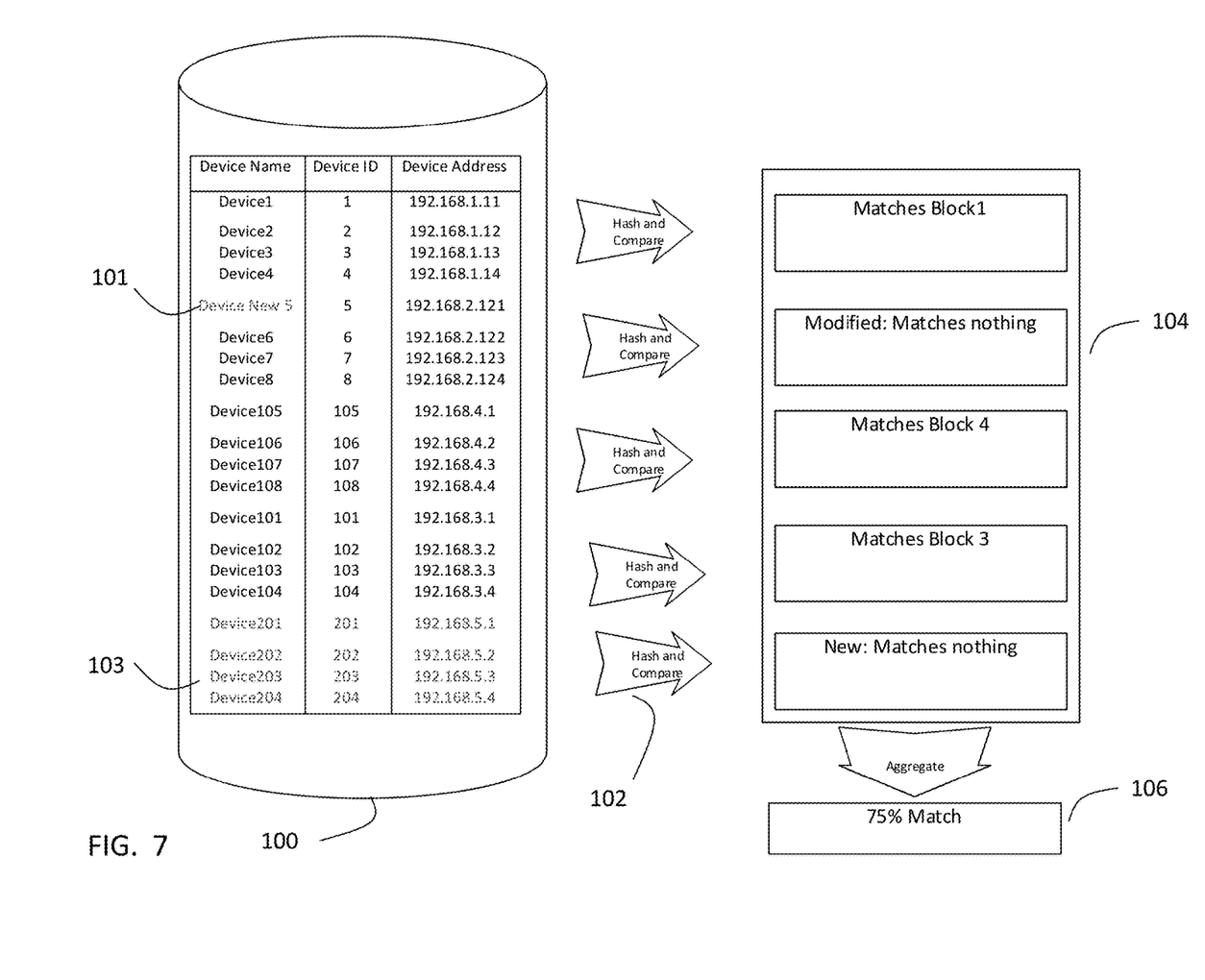
FIG. 7 depicts generation of a fingerprint when configuration data is modified in an exemplary embodiment.

FIG. 7 illustrates comparing a current fingerprint to a reference fingerprint and determining a degree of similarity, when the configuration data has changed since the creation of the reference fingerprint. For example, the user system 14 may install additional devices, remove devices, etc. FIG. 7 depicts exemplary configuration data 100, which includes a new device 101 and a new block of devices 103. Process 102 represents applying a function to the blocks of configuration data 100 and comparing the resulting current fingerprint blocks to reference fingerprint blocks. Comparison results 104 are determined for each block. As shown in FIG. 7, the comparison results 104 indicate that the presence of new device 101 and new block of devices 103 results in two current fingerprint blocks not matching respective reference fingerprint blocks. The block comparison results 104 are then aggregated to yield a degree of similarity 106 between the current fingerprint and reference fingerprint. If the degree of similarly meets a threshold (e.g., 75%), then the current fingerprint is deemed to match the reference fingerprint.

Figure 8:
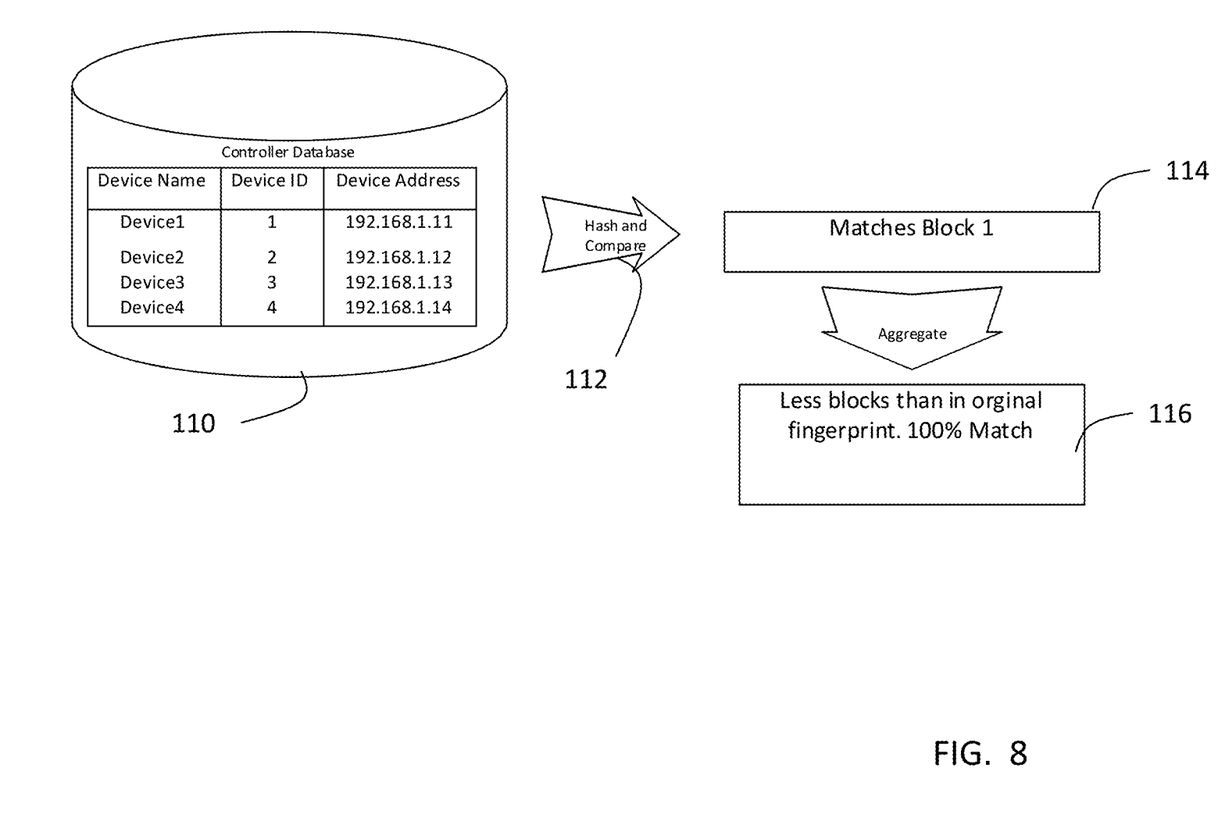
FIG. 8 depicts generation of a fingerprint when configuration data is deleted in an exemplary embodiment.

FIG. 8 illustrates comparing a current fingerprint to a reference fingerprint and determining a degree of similarity, when a portion of the configuration data has been deleted since the creation of the reference fingerprint. FIG. 8 depicts exemplary configuration data 110, which is missing several devices as compared to configuration data 80 of FIG. 6. Process 112 represents applying a function to the block of configuration data 110 and comparing the processed block to the reference fingerprint. Comparison results 114 are determined for the single block. As shown in FIG. 8, the comparison results 114 indicate that the sole block fingerprint completely matches block 1 of the reference fingerprint. The degree of similarity 116 between the current fingerprint and reference fingerprint still may be sufficient, as the block fingerprint completely matches block 1 of the reference fingerprint. Thus, a variety of techniques may be used to determine the degree of similarly between the current fingerprint and the reference fingerprint.

As described above, the exemplary embodiments can be in the form of computer-implemented processes and devices for practicing those processes, such as data server 12, resource server 18 and activation server 22. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for providing access to a resource to a user system network, wherein the user system network includes a plurality of network devices, the method comprising:
    obtaining, by a system comprising one or more processors, configuration data that includes a device name, a device identifier, and a device address for each network device of the plurality of network devices of the user system network;
    receiving, by the system, a request from the user system network for access to the resource;
    generating, by the system, a single current fingerprint of the user system network by applying a hash function to a single combination, the single combination comprising all of the device names of the plurality of network devices, all of the device identifiers of the plurality of network devices, and all of the device addresses of the plurality of network devices;
    comparing, by the system, the single current fingerprint of the user system network to a reference fingerprint of the user system network, wherein the reference fingerprint is associated with the resource;
    determining, by the system, a degree of similarity between the single current fingerprint and the reference fingerprint;
    granting, by the system, access to the resource to the user system network in response to the degree of similarity between the single current fingerprint and the reference fingerprint meeting or exceeding a predetermined similarity threshold; and
    in a binding mode:
        obtaining initial configuration data identifying the plurality of network devices installed at the user system network;
        generating the reference fingerprint in response to the initial configuration data; and
        binding the reference fingerprint to the resource.

2. The method of claim 1 wherein granting access includes providing a response to the user system network granting access to the resource.

3. The method of claim 2 wherein the response includes information needed to implement the resource.

4. The method of claim 3 wherein the information needed to implement the resource includes a license key.

5. The method of claim 1 further comprising:
    applying the hash function to the configuration data to generate a second current fingerprint, wherein applying the hash function to the configuration data to generate the second current fingerprint includes dividing the configuration data into blocks of networked devices of the list of networked devices, applying the hash function to each block of network devices to generate current fingerprint blocks, and aggregating the current fingerprint blocks;
    the comparing further includes comparing the current fingerprint blocks to reference fingerprint blocks associated with the resource; and
    the determining further includes determining a degree of similarity between the current fingerprint blocks and the reference fingerprint blocks.

6. The method of claim 5 wherein:
    the determining further includes determining a number of current fingerprint blocks that match blocks of the reference fingerprint blocks, wherein the predetermined similarity threshold comprises a predetermined number of matching blocks.

7. A system for providing access to a resource to a user system network, wherein the user system network includes a plurality of network devices, the system comprising:
    a configuration data store configured to store configuration data comprising a device name, a device identifier, and a device address for each network device of the plurality of network devices of the user system network;
    a data server, comprising one or more hardware processors, configured to receive a request from the user system network for access to the resource, wherein the data server is further configured to generate a single current fingerprint of the user system network by applying a hash function to a single combination, the single combination comprising all of the device names of the plurality of network devices, all of the device identifiers of the plurality of network devices, and all of the device addresses of the plurality of network devices; and
    a resource server configured to:
        compare the single current fingerprint of the user system network to a reference fingerprint of the user system network, wherein the reference fingerprint is associated with the resource;
        determine a degree of similarity between the single current fingerprint and the reference fingerprint;
        grant access to the resource to the user network system in response to the degree of similarity between the single current fingerprint and the reference fingerprint meeting or exceeding a predetermined similarity threshold; and
    in a binding mode:
        obtain initial configuration data identifying the plurality of network devices installed at the user system network;
        generate the reference fingerprint in response to the initial configuration data; and
        bind the reference fingerprint to the resource.

8. A computer program product tangibly embodied on a non-transitory computer readable storage medium for providing access to a resource to a user system network, wherein the user system network includes a plurality of network device, the computer program product including instructions for causing a system comprising one or more processors to execute operations comprising:

obtaining, by the system, configuration data that includes a device name, a device identifier, and a device address for each network device of the plurality of network devices;

receiving, by the system, a request from the user system network for access to the resource;

generating, by the system, a single current fingerprint of the user system network by at least applying a hash function to a single combination comprising all of the device names of the plurality of network devices, all of the device identifiers of the plurality of network devices, and all of the device addresses of the plurality of network devices;

comparing, by the system, the single current fingerprint of the user system network to a reference fingerprint of the user system network, wherein the reference fingerprint is associated with the resource;

determining, by the system, a degree of similarity between the single current fingerprint and the reference fingerprint;

granting, by the system, access to the resource to the user system network in response to the degree of similarity between the single current fingerprint and the reference fingerprint meeting or exceeding a predetermined similarity threshold;

in a binding mode:

obtaining initial configuration data identifying the plurality of network devices installed at the user system network;

generating the reference fingerprint in response to the initial configuration data; and binding the reference fingerprint to the resource.

* * * * *